April 2, 1935.　　　　D. J. DOLAN　　　　1,996,281
AIRPLANE
Filed Sept. 4, 1931　　　5 Sheets-Sheet 1
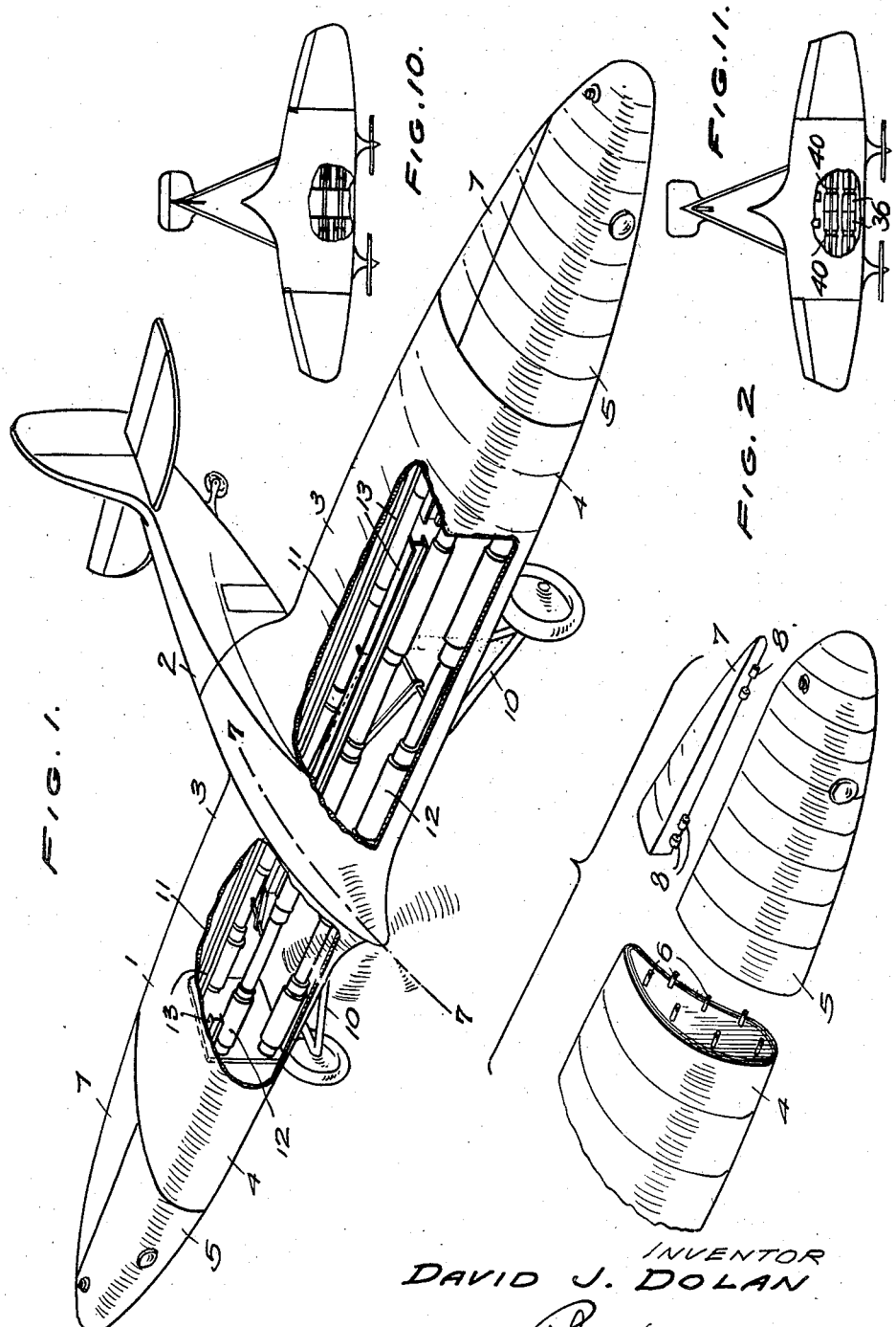
INVENTOR
DAVID J. DOLAN
BY
ATTORNEY

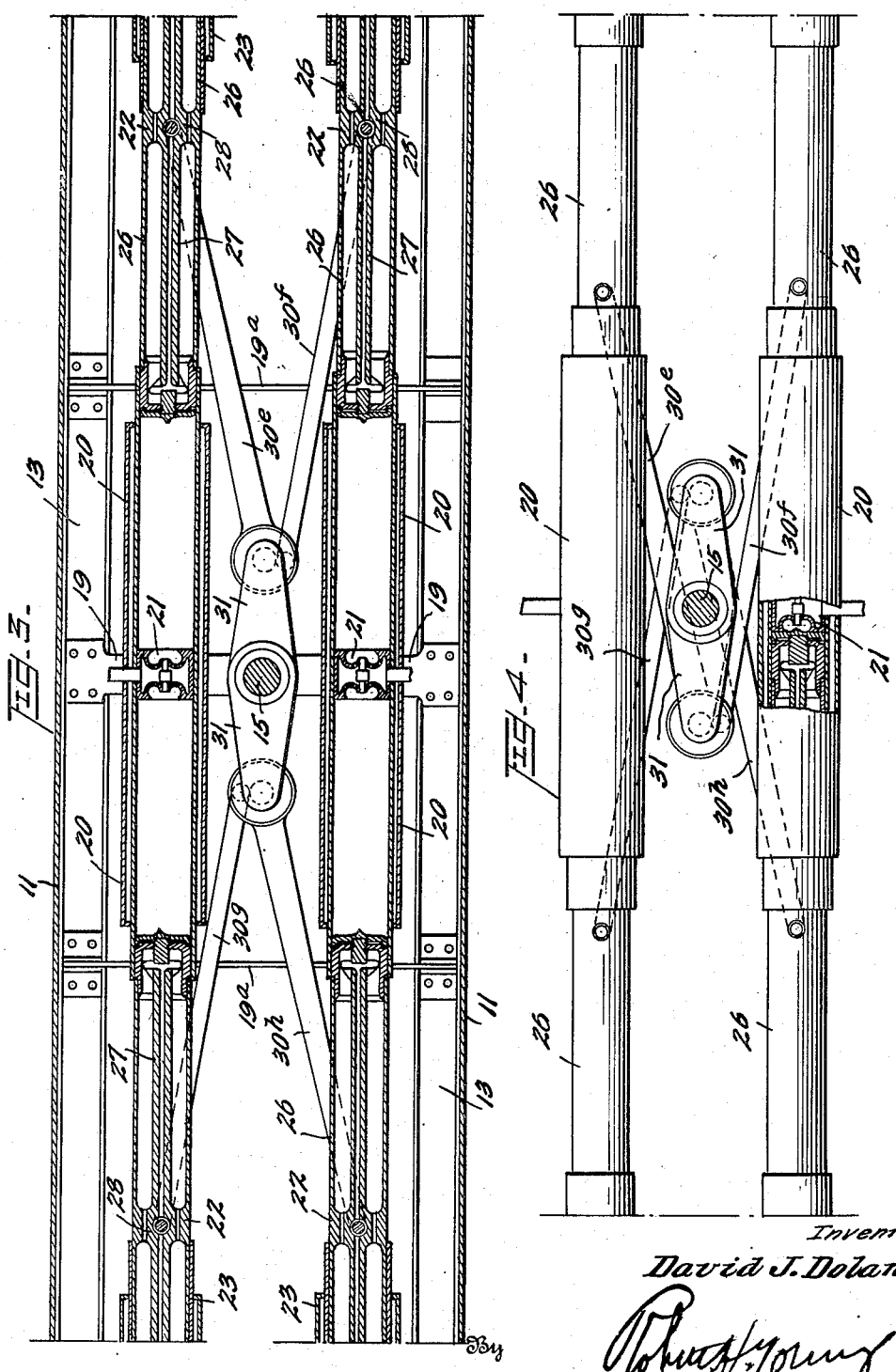

April 2, 1935.  D. J. DOLAN  1,996,281
AIRPLANE
Filed Sept. 4, 1931   5 Sheets-Sheet 3
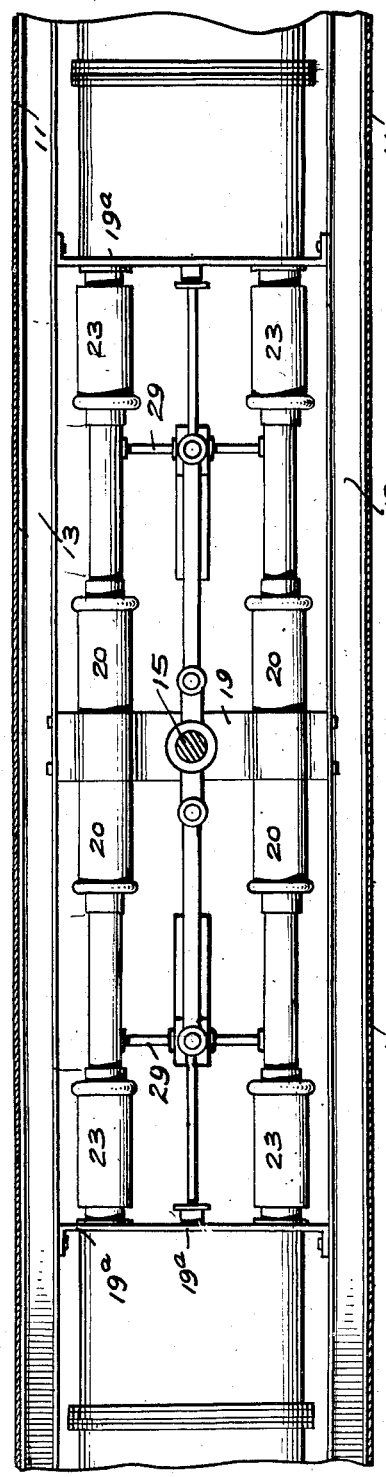
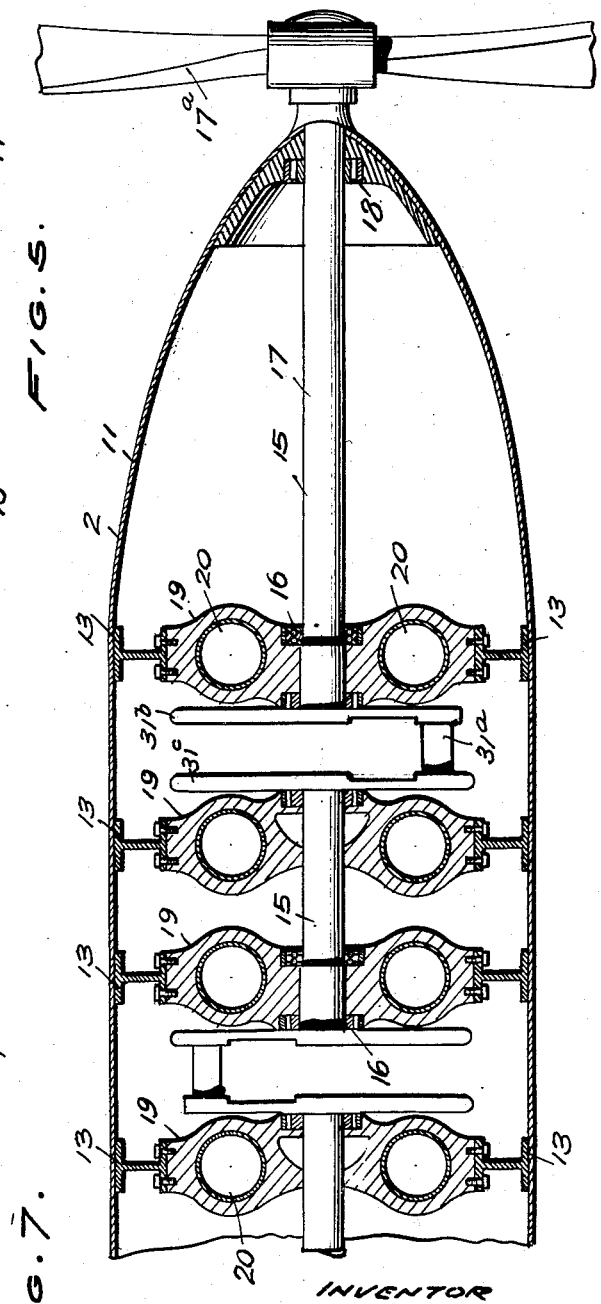
INVENTOR
DAVID J. DOLAN
BY
ATTORNEY

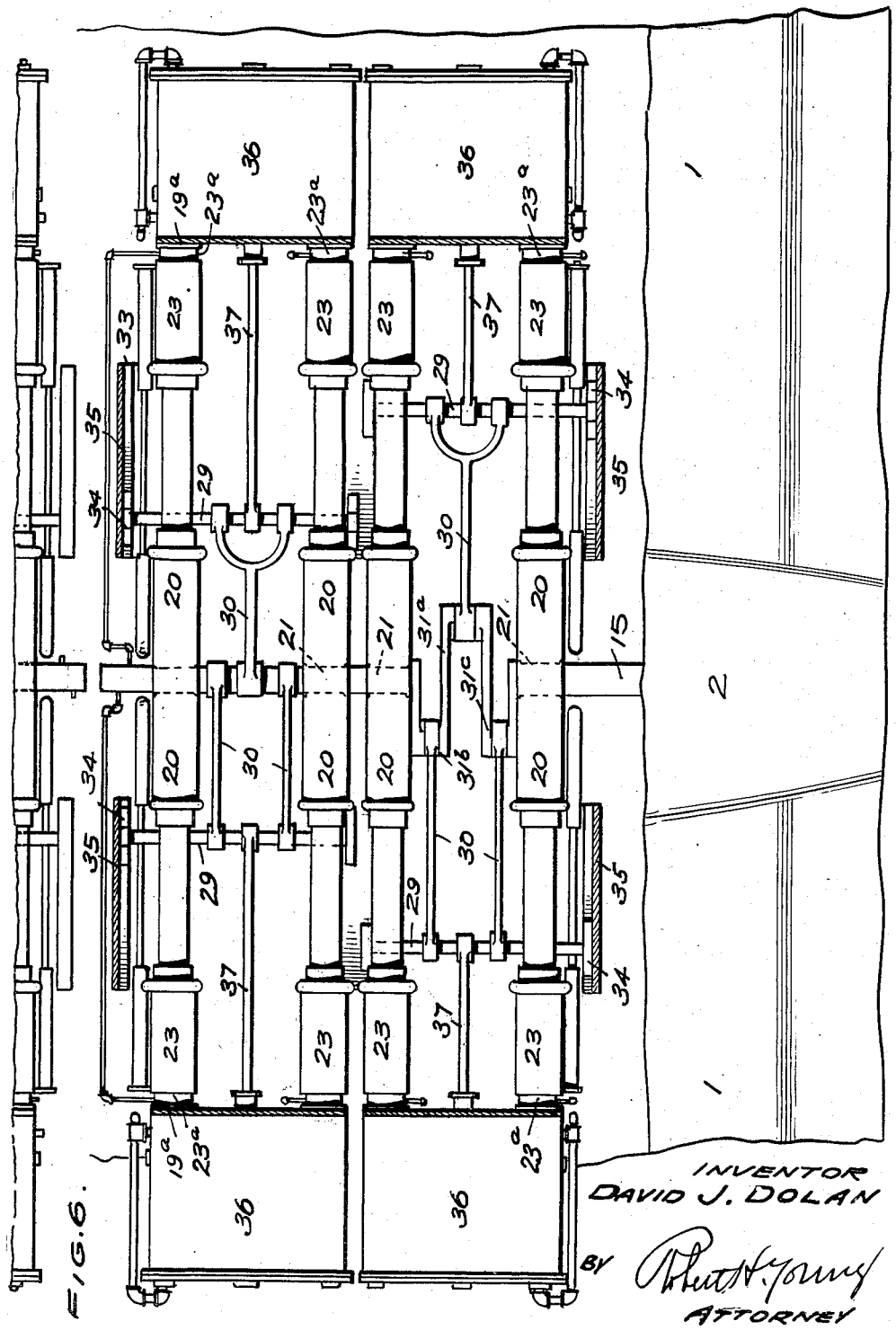

April 2, 1935.  D. J. DOLAN  1,996,281
AIRPLANE
Filed Sept. 4, 1931   5 Sheets-Sheet 5
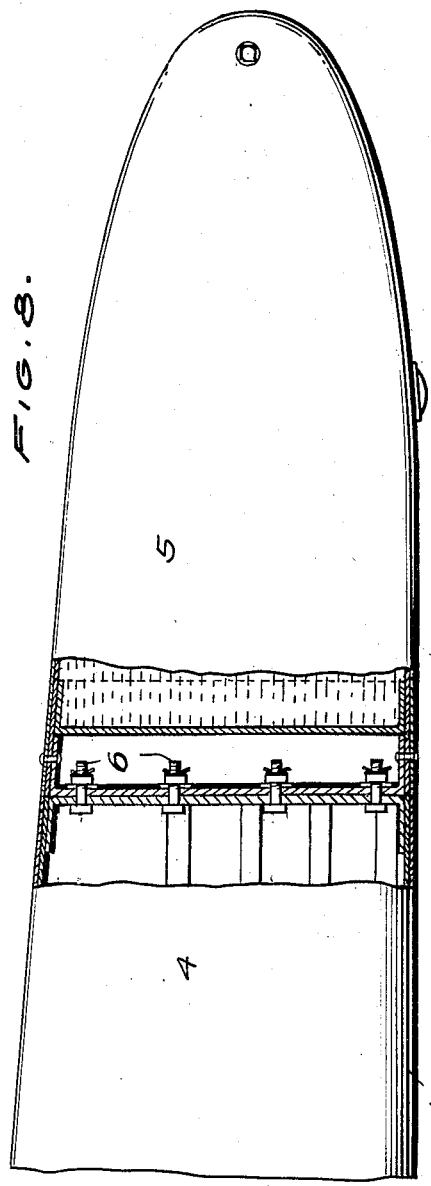
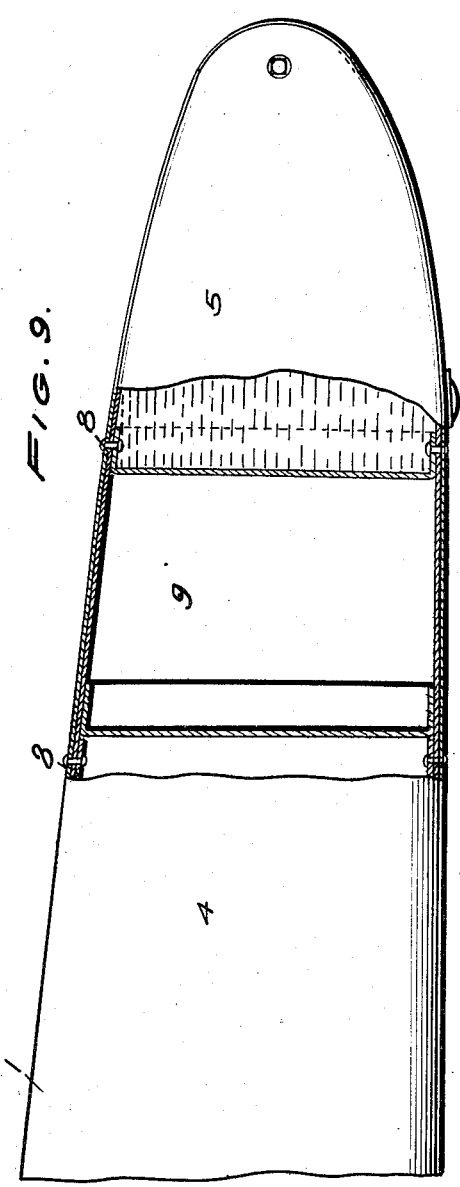
INVENTOR
DAVID J. DOLAN
BY
ATTORNEY Patented Apr. 2, 1935

1,996,281

UNITED STATES PATENT OFFICE 1,996,281

AIRPLANE

David J. Dolan, Cleveland, Ohio

Application September 4, 1931, Serial No. 561,290

8 Claims. (Cl. 244—14)

This invention relates in general to aeronautics and is more particularly concerned with an internal combustion engine of such design and character as to form a structural part of the aircraft with which it is designed to be used.

It is the purpose of this invention to design an airplane in which the engine is constructed and positioned in such a manner that its weight is distributed throughout substantially the entire efficient supporting surface of the airplane, the engine, itself, forming an important part of the interior structure of said supporting surface. Such an engine is the horizontal, double opposed, two-cycled Diesel engine disclosed in my co-pending application Serial Number 507,780, filed January 10, 1931, of which this application is a continuation in part.

It is a further object of this invention to use my engine as an integral part of the interior wing structure thus providing for perfect streamline of the engine, a feat which would be difficult of accomplishment with a large bore, long stroke, engine of conventional design. The use of my engine will permit of the use of large bores, the engine approximating in depth the depth of the wing, and the long stroke feature will lend rigidity to the entire wing structure.

It is another object of my invention to use my engine as interior wing bracing to the end that important elements of normal wing structure such as one or more spars, ribs and cross braces may be dispensed with, thus reducing the total weight of the craft.

It is a further object of my invention, in so distributing the weight of my engine, to avoid the bending stresses and resultant necessary supporting structure required when the weight is localized as is the case when conventional engines are used.

A further object of my invention is to obtain improved airplane performance by a more even distribution of weight in its relation to supporting areas.

It is still another object of my invention to mount my engine so that its major dimension extends longitudinally of the wing with its crankshaft, or crank shafts, extending transversely thereto, to permit of the use of the long stroke, large bore, Diesel engine, the wing covering and substructure forming part of the crank-case of the engine.

It is still a further object of this invention to so mount my engine that its torque reaction and torque recoil will be resisted by the engine throughout its entire length; and hence, since the engine extends substantially throughout the length of the wing, the recoil action and torque effects will be reduced to a minimum.

It is a further object to provide, as a novel wing structure, fuel tank wing sections detachably connectable to the outer ends of the motor bearing wing sections, thus minimizing, by their location, the danger of fire hazard to the occupants of the craft.

Another object obtained by this invention is the safety factor provided by the rigidity of wing structure afforded by the engine. This rigidity will prevent destruction of the wing in cases of propeller failure and will minimize the hazards of a crash landing.

Still a further object of this invention is to provide a wing structure of such rigidity that the positioning of the landing gear may be that of convenience in design rather than of necessity required in supporting concentrated motor weights.

Another object of this invention is that this engine is so conformed to the natural characteristics of a large supporting surface that engine rooms can readily be constructed permitting servicing in flight. Such engine rooms may be constructed on opposite sides of the central longitudinal axis of the plane leaving the center of the wing available for grouping the crew, passengers and cargo at the approximate center of gravity of the craft.

It is still a further object of my invention to provide an engine such that all stresses created by it are neutralized by counter forces of the same order.

It is still a further object to devise for this purpose such an engine as is useable either as a unit or as one of a series of units that can be coupled together to synchronize either as a whole or in any separate series of units.

Other objects of my invention will be found in the following specification and claims and will be disclosed in the accompanying drawings in which—

Figure 1 is a perspective view of an airplane constructed in accordance with my invention, parts of the plane being broken away in the drawings to disclose the general plane of my assembly;

Figure 2 is a detail, also in perspective, showing the wing section fuel tank, the method of its assembly with the main wing section and the method of attaching the aileron surface to said tank section;

Figure 3 is a front elevation of a portion of my engine disclosing my opposed cylinder arrangement, partly shown in section, and the arrangement of the crank shaft and connecting rods;

Figure 4 is a view similar to that shown in Figure 3 and disclosing the details of the cross head connections;

Figure 5 is an end view of a modification of my engine, disclosing the cylinder and compressor plan and the method of connection to the crank case and wing structure;

Figure 6 is a top plan view of two of my engines, such as are shown in Figure 5, combined in tandem and disclosing the details of the cross head shoes on the cross head plate;

Figure 7 is a central vertical section taken through the crank shaft on line 7—7 of Figure 1, disclosing the method of securing the cylinders to the wing structure;

Figure 8 is a detail in top plan view with parts broken away, disclosing the fuel tank attached to the main wing section;

Figure 9 is a modification of Figure 8, disclosing an additional intermediate wing section providing a space useable for baggage;

Figure 10 is a top plan view, with parts broken away, disclosing my invention as applied to a plane having a plurality of engine units driving separate propellers and spaced by a central compartment for passengers, crew, and cargo;

Figure 11 is a view similar to Figure 6 showing the disposition of a pair of my engines disposed end to end longitudinally of their cylinders and fixed rigidly with respect to each other.

Referring now with greater particularity to the drawings, and having reference first to Figure 1, it will be seen that my device is comprised as follows.

An airplane 1, disclosed in this figure as a monoplane, has a suitable fuselage 2, and a wing, or wings, 3. The wing 3 has a main supporting section 4, and outer sections 5 designed for use as fuel tanks. These fuel tanks are detachably securable, as shown in Figures 1, 8 and 9, to the main supporting section by means of bolts 6. At 7 are shown the aileron control surfaces detachably connectable at 8 to the fuel tank sections. In Figure 9 another wing section 9 is intended for use as a light baggage compartment.

A suitable landing gear 10 is provided. This landing gear may be attached at any point suitable to the design of the airplane as a whole, as will hereinafter be disclosed, and need not be placed at any particular points of the engine weight concentration. The wing is, preferably of metallic construction having a metal covering 11, and a primary internal brace and strength structure comprised of the engine 12 disposed with its major dimension, its length from cylinder end to its farthest opposed cylinder end, longitudinally of the wing itself. The engine, or engines, are of such length as to extend throughout substantially the entire length of the main efficient lifting surface of the wing. Intermediate of the metal skin covering I have disclosed, as a part of the supplementary interior bracing, a plurality of I-beams 13 extending longitudinally of the wing and secured to the engine cylinders from point to point as will be described hereinafter. Outward of the engine cylinders these beams are secured to the metal wing covering. As this specification progresses it will be seen that the engine itself forms the principal interior brace structure of the wing, the I-beams serving as supplementary brace means and as means for securing the covering 11 to the engine. In my device the wing will be, of necessity, assembled about the engine.

Having reference now particularly to Figures 3, 4, 5 and 7, it will be seen that my engine has a horizontal crank-shaft 15 extending transversely of the wing and mounted in suitable bearings 16. At least one, and, if desirable, as in Figure 7, both ends of this crank shaft terminate in propeller shafts 17 for mounting a propeller 17a. Suitable propeller shaft bearings 18 are provided. The bearings 17 are formed or supported in members 19 which are secured to the I-beams to form a part of the substructure. Above and below the crank shaft and beyond the cranks thereof, are located two or more pairs of cylinders 20. In Figure 6 I have disclosed four pairs of such cylinders. Each of these cylinders has a central head portion 21 secured to the structure 19. The crank-shaft is in the plane of these four head portions. The ends of the cylinders 20 are open and a composite piston 22 is arranged to be reciprocated therein. Thus eight combustion chambers are formed for each double pair of cylinders 20, one on each side of the combustion head. Opposite the end of each cylinder 20 secured at its head end to substructure 19a, and aligned with said cylinder 20, is another cylinder 23 in which the other end of the composite piston 22 is reciprocated. The head end 23a of each of these cylinders is secured to substructure 19a. The composite piston 22 is composed of pistons 24 and 25, cylindrical spacers 26, piston rods 27 and a centrally disposed member 28 to which the rods 27 are secured.

Extending parallel with the crank-shaft between each corresponding pair of cylinders in the same horizontal plane is a cross head member 29. A connecting rod 30 connects each of the cross-heads with one of the cranks 31 of the crank-shaft 15.

As indicated in Figures 5 and 6, preferably, one of the cranks 31a, is located in the central vertical plane, and the other crank is in the form of two smaller cranks 31b and 31c, to the sides of the crank 31a. Thus on one side of the engine there will be two connecting rods 30 and on the other side one.

As indicated in Figures 3 and 4 I have shown a preferred arrangement in which a master rod 31e has secured thereto, in a manner to permit of relative oscillation, a plurality of rods 30f, 30g and 30h.

Cross-head members 33 connect each pair of pistons that are on the same side of the crank-shaft and are in the same horizontal plane which cross-head members are connected directly to the connecting rods 30. The cross-head members 29 extend beyond their cylinders and carry, at their ends, shoes 34 movable along stationary ways 35 mounted on the substructure 19.

Each of the cylinders 23 is secured to the substructure 19a at its head end and each of the cylinders 20 is secured at its central head portion to the substructure 19. Thus all of the cylinders may expand freely in crank end direction, yet the engine as a whole is secured to the substructure and forms therewith an integral rigid structure. By the cylinder arrangements described above the pistons are relieved of substantially side thrust in their cylinders. It will be noticed that this arrangement will provide for a very long stroke in proportion to the bore.

The engine disclosed is intended to operate on the two stroke cycle, and particularly the cycle described in my co-pending application Serial Number 507,779, filed January 10, 1931, so that a source of air pressure is needed. Therefore, adjacent the head ends 23a of cylinders 23 I have provided air compressor cylinders 36. These cylinders 36 are thus joined directly to the power cylinders 23 and lend great rigidity to the entire structure. For a complete disclosure of these air compressors and their operation see my co-pending application Serial Number 507,780, filed January 10, 1931. For the purposes of this application it will suffice to disclose the piston rods 37 as connecting the cross head members 33 to double acting pistons (not shown) within the air compressor cylinders 36. The piston rods are disclosed as bored for lubrication and the cylinders are disclosed as water-jacked but all further details of operation of the engine, other than those which have been described, have been omitted from this disclosure in the interest of clarity, as they have been fully described in the co-pending applications designated above. The principal features of interest of the engine as concerning this application being its great width in comparison to its height and depth, with its resulting capacity for mounting within an airplane wing, its long stroke, its torque and torque recoil damping characteristics, its rigidity and configuration of structure as lending itself admirably to the internal bracing of the wing, and its capacity for permitting expansion due to heat.

While most of this disclosure has been concerned with the description of a single engine, or a single battery of engines operating one propeller it is obvious that any given number of combinations of such engines or batteries of engines may be used without departing from the spirit of my invention.

In the disclosures of Figures 6 and 7 a pusher propeller may be mounted on the end of the crank-shaft opposite that carrying the propeller 17. Or a pair of laterally spaced engines may be used as disclosed in Figure 10. Or again two or more of these engines may be secured to each other, end to end as disclosed in Figure 11, this latter arrangement being preferred in engines of very large wing span. In Figure 11 two engines are disclosed as having their adjacent compression cylinders 36 rigidly secured to each other by means of a substructure member 40 to which each is secured fixedly. This arrangement permits the combined engine units to be substituted for one or more of the spars and/or ribs normally found within an airplane wing.

From the foregoing it will be seen that I have devised an improved structure wherein the entire engine is installed within the lines of the wing surface, thus eliminating head resistance of the engine; my structure is such that the engine comprises the chief internal strength and load supporting structure of the wing, thus dispensing with the necessity of spars, reducing weight and cost; my structure has greatly increased the strength and rigidity of interior wing structure and has more equally distributed weight to lifting surfaces thus minimizing bending moments; and my engine provides for a long bore in proportion to stroke which lends itself particularly as adaptable for burning low grade fuels. Furthermore, I have provided a novel arrangement of attaching fuel tank sections in such a manner as to reduce fire hazards. Another great advantage of the use of my device is that this highly efficient double-opposed engine tends to damp out and minimize torque effects and torque recoil, the reciprocating parts having inherent balance.

I have described more than one arrangement of the parts of my structure, and it is obvious that other changes may be made without departing from the spirit of this invention, but it is my purpose to include all such structures as may be reasonably included as covered in the following claims.

Having thus described my invention what I claim is—

1. In an airplane construction, a fuselage, wings extending laterally therefrom, an engine in each wing extending longitudinally thereof and comprising substantially the entire internal support thereof.

2. In an airplane construction, a fuselage, wings extending laterally therefrom, and an interior wing construction for each wing comprised substantially of an internal combustion engine extending longitudinally of each wing.

3. In an airplane construction, a fuselage, wings extending laterally therefrom, each of said wings comprised substantially of an internal combustion engine extending longitudinally of each wing and a covering entirely inclosing said engine.

4. In an airplane construction, a fuselage, wings extending laterally therefrom, each of said wings being composed substantially entirely of a wing covering and an internal combustion engine, said internal combustion engine extending substantially longitudinally throughout the length of said wing and being entirely enclosed within the covering of the wing.

5. In an airplane construction, a fuselage, wings extending laterally therefrom, the interior wing structure for each wing consisting substantially entirely of a plurality of internal combustion engine units, and means for rigidly securing said engine units to each other.

6. In an airplane construction, a fuselage, wings extending laterally therefrom, a covering for each wing, the interior wing structure consisting substantially of a plurality of internal combustion engine units extending longitudinally of each wing, and means for rigidly securing each unit to the other unit and to said covering.

7. In an airplane construction, a fuselage, wings extending laterally therefrom, a covering for each wing, a substructure interior of each wing covering and secured thereto, an internal combustion engine in each wing rigidly secured to and enclosed within said substructure, said substructure comprising a crank case for the engine.

8. In an airplane construction, a fuselage, wings extending laterally therefrom, a covering for each wing, a substructure within each wing covering and secured thereto, an internal combustion engine rigidly secured to and enclosed within said substructure, said engine being adapted to brace the substructure interiorly and said substructure comprising a crank case for the engine.

DAVID J. DOLAN.